United States Patent
Wang

(10) Patent No.: US 10,567,651 B2
(45) Date of Patent: Feb. 18, 2020

(54) SYSTEM AND METHOD FOR IMAGE PROCESSING

(71) Applicant: SZ DJI TECHNOLOGY CO., LTD., Shenzhen (CN)

(72) Inventor: Mingyu Wang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 15/867,465

(22) Filed: Jan. 10, 2018

(65) Prior Publication Data

US 2018/0131871 A1    May 10, 2018

Related U.S. Application Data

(63) Continuation of application No. PCT/CN2015/085732, filed on Jul. 31, 2015.

(51) Int. Cl.
*H04N 5/232* (2006.01)
*B64C 39/02* (2006.01)
(Continued)

(52) U.S. Cl.
CPC ....... *H04N 5/23245* (2013.01); *B64C 39/024* (2013.01); *B64D 47/08* (2013.01);
(Continued)

(58) Field of Classification Search
CPC .... H04N 5/23245; H04N 5/232; H04N 9/735; B64C 39/024; B64D 47/08; G03B 7/08; G03B 15/006; G06K 9/0063
(Continued)

(56) References Cited

U.S. PATENT DOCUMENTS

2011/0267492 A1* 11/2011 Prentice .................. G03B 7/08
 348/223.1
2012/0081281 A1* 4/2012 Morichika ........... G01C 21/367
 345/156

(Continued)

FOREIGN PATENT DOCUMENTS

CN  102445212 A  5/2012
CN  102707284 A  10/2012
(Continued)

OTHER PUBLICATIONS

The World Intellectual Property Organization (WIPO) International Search Report and Written Opinion for PCT/CN2015/085732 dated Sep. 28, 2015 6 Pages.

*Primary Examiner* — Sinh Tran
*Assistant Examiner* — Zhenzhen Wu
(74) *Attorney, Agent, or Firm* — Anova Law Group, PLLC

(57) ABSTRACT

A system for performing image processing determines one or more conditions of an imaging device positioned on an aerial vehicle or another mobile platform. Exemplary conditions include one or more of an ambient condition or a scenery content. The ambient condition is determined via devices available on the mobile platform. The scenery content is obtained via the devices and preloaded local data. Based upon the determined conditions, an appropriate operation mode of the imaging device is selected from among multiple operation modes of the imaging device. These operation modes are categorized, for example, based on a set of predetermined condition categories.

12 Claims, 10 Drawing Sheets

(51) Int. Cl.
*H04N 9/73* (2006.01)
*B64D 47/08* (2006.01)
*G06K 9/00* (2006.01)

(52) U.S. Cl.
CPC ........... *G06K 9/0063* (2013.01); *H04N 9/735* (2013.01); *B64C 2201/127* (2013.01); *B64C 2201/145* (2013.01)

(58) Field of Classification Search
USPC ...................................................... 348/222.1
See application file for complete search history.

(56) References Cited

U.S. PATENT DOCUMENTS

| | | | | |
|---|---|---|---|---|
| 2013/0077931 A1* | 3/2013 | Cornell | ................. | H04N 5/232 386/224 |
| 2015/0057844 A1* | 2/2015 | Callou | ................. | G05D 1/0204 701/3 |
| 2016/0014554 A1* | 1/2016 | Sen | ....................... | H04W 4/029 455/456.2 |

FOREIGN PATENT DOCUMENTS

| | | |
|---|---|---|
| CN | 102859990 A | 1/2013 |
| CN | 103891265 A | 6/2014 |
| JP | 2004245657 A | 9/2004 |
| JP | 2008292663 A | 12/2008 |
| JP | 2011082770 A | 4/2011 |
| JP | 2012095082 A | 5/2012 |
| JP | 2013526215 A | 6/2013 |
| JP | 2014082658 A | 5/2014 |
| JP | 2014145784 A | 8/2014 |
| JP | 2015514263 A | 5/2015 |
| JP | 2015106840 A | 6/2015 |
| WO | 2015088628 A2 | 6/2015 |

* cited by examiner

SYSTEM AND METHOD FOR IMAGE PROCESSING

CROSS-REFERENCE TO RELATED APPLICATION

This is a continuation application of International Application No. PCT/CN2015/085732, filed on Jul. 31, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to image processing and more particularly, but not exclusively, to systems and methods for adjusting an imaging parameter.

BACKGROUND

In image processing, certain imaging parameters, such as exposure time, white balance, color compensation and the like, of an imaging device may need adjustment based on imaging conditions to ensure picture quality.

Currently-available solutions for adjusting an imaging parameter rely on sensors installed with the imaging device to acquire the imaging conditions. Such traditional solutions are generally limited by capacities of the sensors of the imaging device because an available space of the imaging device is restricted. With the sensors installed, the currently-available solutions can also increase costs of the imaging device, if a capacity for adjusting an imaging parameter is desired.

In view of the foregoing reasons, there is a need for systems and methods for adjusting an imaging parameter without relying on any sensors installed with the imaging device.

SUMMARY

In accordance with a first aspect disclosed herein, there is set forth a method for image processing, comprising:
determining one or more conditions of an imaging device associated with a mobile platform; and
adjusting at least one imaging parameter based on a result of the determining.

In an exemplary embodiment of the disclosed methods, determining comprises determining an ambient condition of the imaging device.

In another exemplary embodiment of the disclosed methods, determining the ambient condition comprises determining the ambient condition via at least one sensing device associated with the mobile platform.

In another exemplary embodiment of the disclosed methods, determining the ambient condition comprises determining the ambient condition via at least one of a Global Positioning System ("GPS") device, a barometer, an ultrasonic device and a map.

In another exemplary embodiment of the disclosed methods, determining the ambient condition comprises deciding whether the imaging device is operating in an indoor setting or an outdoor setting.

In another exemplary embodiment of the disclosed methods, determining the ambient condition further comprises measuring signal strength of a satellite signal received by the GPS device.

In another exemplary embodiment of the disclosed methods, deciding comprises:
determining whether a number of satellite signals received by the GPS device is greater than a first threshold; and
determining that the imaging device is operating in the outdoor setting when the number of satellite signals received by the imaging device is greater than the first threshold.

In another exemplary embodiment of the disclosed methods, the first threshold is a number of five satellites.

In another exemplary embodiment of the disclosed methods, determining the ambient condition comprises acquiring location information of the imaging device.

In another exemplary embodiment of the disclosed methods, acquiring the location information comprises acquiring the location information using at least one of the GPS device and the map.

In another exemplary embodiment of the disclosed methods, determining the ambient condition comprises determining the imaging device is operating in an outdoor setting when the imaging device is located in an open field.

In another exemplary embodiment of the disclosed methods, deciding comprises determining whether the imaging device is located in the open field based on the location information.

In another exemplary embodiment of the disclosed methods, determining the ambient condition further comprises acquiring a height of the imaging device using at least one of a barometer and an ultrasonic device.

In another exemplary embodiment of the disclosed methods, determining the ambient condition comprises:
determining the imaging device is operating in the outdoor setting when the height of the imaging device is equal or greater than a second threshold or when the imaging device is located in an open area.

In another exemplary embodiment of the disclosed methods, determining the ambient condition comprises:
determining the imaging device is operating in the indoor setting when the height of the imaging device is lower than the second threshold and the imaging device is located is indicated to be in a building area.

In another exemplary embodiment of the disclosed methods, the second threshold is thirty meters.

In another exemplary embodiment of the disclosed methods, adjusting the at least one imaging parameter comprises:
choosing a parameter associated with an outdoor mode, and
adjusting the chosen parameter when the determining indicates that the imaging device is operating in the outdoor setting.

In another exemplary embodiment of the disclosed methods, adjusting the at least one imaging parameter comprises:
choosing at least one parameter associated with an indoor mode; and
adjusting the chosen parameter when the determining indicates that the imaging device is operating in the indoor setting.

In another exemplary embodiment of the disclosed methods, determining comprises determining scenery content of an image captured by the imaging device.

In another exemplary embodiment of the disclosed methods, determining the scenery content comprises determining the scenery content using at least one of a height, an orientation and a tilt angle of a gimbal of the imaging device.

In another exemplary embodiment of the disclosed methods, determining the scenery content comprises determining the scenery content using at least one of geographic data, time data, local seasonal data and weather data.

In another exemplary embodiment of the disclosed methods, determining the scenery content further comprises:

determining an angle between a directional plane of the imaging device and a horizontal plane.

In another exemplary embodiment of the disclosed methods, determining the scenery content further comprises:

determining whether the imaging device is being aimed in a horizontal direction when the angle is less than a third threshold.

In another exemplary embodiment of the disclosed methods, determining the scenery content further comprises:

calculating a position of the sun based on the seasonal data and the time data; and determining whether the imaging device is being aimed at the sun based on a result of the calculating.

In another exemplary embodiment of the disclosed methods, determining the scenery content comprises determining brightness or darkness of the scene.

In another exemplary embodiment of the disclosed methods, determining the scenery content comprises determining whether the imaging device is being aimed at a dark scene based upon the determining the brightness or darkness of the scene.

In another exemplary embodiment of the disclosed methods, determining whether the imaging device is being aimed at a dark scene comprises:

determining whether the imaging device has the angle being greater than a fourth threshold and whether the map data indicates the imaging device is over the dark scene; and determining the imaging device is being aimed at the dark scene when the imaging device has the angle being greater than the fourth threshold and the map data indicates the imaging device is over the dark scene.

In another exemplary embodiment of the disclosed methods, determining the scenery content further comprises determining whether the imaging device is being aimed at a bright scene based upon the determining the brightness or darkness of the scene.

In another exemplary embodiment of the disclosed methods, determining whether the imaging device is being aimed at a bright scene comprises:

determining whether the imaging device has the angle being greater than the fourth threshold, and whether the map data indicates the imaging device is over a bright scene; and determining the imaging device is being aimed at the bright scenery content when the imaging device has the angle being greater than the fourth threshold and the map data indicates the imaging device is over the bright scene.

In another exemplary embodiment of the disclosed methods, determining whether the imaging device is being aimed at the bright scene comprises determining local seasonal data and weather data.

In another exemplary embodiment of the disclosed methods, adjusting the at least one parameter comprises choosing a High Dynamic Range ("HDR") mode when the imaging device is being aimed at a horizontal direction and aimed at the sun.

In another exemplary embodiment of the disclosed methods, adjusting at least one parameter comprises choosing a dark mode of the imaging device when the imaging device is being aimed at a dark scene.

In another exemplary embodiment of the disclosed methods, adjusting at least one parameter comprises choosing a bright mode of the imaging device when the imaging device is being aimed at bright scenery content.

In another exemplary embodiment of the disclosed methods, adjusting the at least one parameter comprises choosing a default daytime mode when the imaging device is operating during a day and the scenery content cannot be determined, wherein, the day is determined via the local seasonal data and a clock time.

In another exemplary embodiment of the disclosed methods, adjusting the at least one parameter comprises choosing a default nighttime mode when the imaging device is operating during a night and the scenery content cannot be determined, wherein, the day is determined via the local seasonal data and a clock time.

In another exemplary embodiment of the disclosed methods, the mobile platform is an Unmanned Mobile platform ("UAV").

In accordance with another aspect disclosed herein, there is set forth an imaging system configured to perform the imaging process in accordance with any one of previous embodiments of the disclosed methods.

In accordance with another aspect disclosed herein, there is set forth a computer program product comprising instructions for imaging in accordance with any one of previous embodiments of the disclosed methods.

In accordance with another aspect disclosed herein, there is set forth a system for image processing, comprising:

an imaging device associated with a mobile platform for capturing an image; and one or more processors for adjusting at least one imaging parameter base on one or more operating conditions of the imaging device.

In an exemplary embodiment of the disclosed systems, the one or more processors determine one or more operating conditions of the imaging device.

In another exemplary embodiment of the disclosed systems, the operating conditions are determined using at least one of a plurality of sensing devices associated with the mobile platform.

In another exemplary embodiment of the disclosed systems, the one or more processors adjust the at least one imaging parameter based upon the one or more conditions.

In another exemplary embodiment of the disclosed systems, the one or more processors select a plurality of imaging parameters based upon the conditions.

In another exemplary embodiment of the disclosed systems, the one or more processors are configured to determine an ambient condition of the imaging device.

In another exemplary embodiment of the disclosed systems, the plurality of sensing devices are selected from a group of sensing devices consisting of a Global Positioning System ("GPS") device, a barometer, an ultrasonic device and a map, wherein the at least one sensing device is associated with the mobile platform.

In another exemplary embodiment of the disclosed systems, the one or more processors are configured to determine the ambient condition by deciding whether the imaging device is operating in an indoor setting or an outdoor setting via the plurality of condition parameter devices.

In another exemplary embodiment of the disclosed systems, the one or more processors are configured to measure a signal strength of a satellite signal received by the GPS device.

In another exemplary embodiment of the disclosed systems, the one or more processors are configured to determine whether a number of satellite received by the GPS device is greater than a first threshold, and configured to determine that the imaging device is operating in the outdoor setting when the number of satellite signals received by the imaging device is greater than the first threshold.

In another exemplary embodiment of the disclosed systems, the first threshold is a number of five satellites.

In another exemplary embodiment of the disclosed systems, the one or more processors are configured to acquire location information of the imaging device.

In another exemplary embodiment of the disclosed systems, the location information is acquired using at least one of the GPS device and the map.

In another exemplary embodiment of the disclosed systems, the location is determined in an outdoor setting when the imaging device is located in an open field.

In another exemplary embodiment of the disclosed systems, the one or more processors are configured to determine whether the imaging device is located in the open field based upon the location information.

In another exemplary embodiment of the disclosed systems, the one or more processors are configured to acquire a height of the imaging device using at least one of a barometer and an ultrasonic device.

In another exemplary embodiment of the disclosed systems, the one or more processors are configured to determine the imaging device is operating in the outdoor setting when the height of the imaging device is equal or greater than a second threshold or the imaging device is located in an open area.

In another exemplary embodiment of the disclosed systems, the one or more processors are configured to determine the imaging device is operating in the indoor setting based upon the determining whether the height of the imaging device is lower than the second threshold and whether the imaging device is indicated to be in a building area.

In another exemplary embodiment of the disclosed systems, the second threshold is thirty meters.

In another exemplary embodiment of the disclosed systems, the one or more processors are configured to choose a parameter associated with an outdoor mode and to adjust the chosen parameter when the imaging device is operating in the outdoor setting.

In another exemplary embodiment of the disclosed systems, the one or more processors are configured to choose at least one parameter associated with an indoor mode and to adjust the chosen parameter when the imaging device is operating in the indoor setting.

In another exemplary embodiment of the disclosed systems, the one or more processors are configured to determine scenery content of an image captured by the imaging device.

In another exemplary embodiment of the disclosed systems, the one or more processors are configured to determine the scenery content using at least one of a height, an orientation and a tilt angle of a gimbal of the imaging device.

In another exemplary embodiment of the disclosed systems, the one or more processors are configured to determine the scenery condition using at least one of geographic data, time data local seasonal data and weather data.

In another exemplary embodiment of the disclosed systems, the one or more processors are configured to determine an angle between a directional plane of the imaging device and a horizontal plane.

In another exemplary embodiment of the disclosed systems, the one or more processors are configured to determine whether the imaging device is being aimed in a horizontal direction when the angle is less than a third threshold.

In another exemplary embodiment of the disclosed systems, the one or more processors are configured to calculate a position of the sun based on the seasonal data and the time data, and wherein the one or more processors are configured to determine whether the imaging device is being aimed at the sun based on the calculation result.

In another exemplary embodiment of the disclosed systems, the one or more processors are configured to determine brightness or darkness of the scene.

In another exemplary embodiment of the disclosed systems, the one or more processors are configured to determine whether the imaging device is being aimed at a dark scene based upon a determined result.

In another exemplary embodiment of the disclosed systems, the one or more processors are configured to determine whether the imaging device has the angle being greater than a fourth threshold and whether the map data indicates the imaging device is over the dark scene, and wherein the one or more processors are configured to determine the imaging device is being aimed at the dark scenery content when the imaging device has the angle being greater than the fourth threshold and whether the map data indicates the imaging device is over the dark scene.

In another exemplary embodiment of the disclosed systems, the one or more processors are configured to determine whether the imaging device is being aimed at a bright scene based upon a determined result.

In another exemplary embodiment of the disclosed systems, the one or more processors are configured to determine whether the imaging device has the angle being greater than the fourth threshold, and whether the map data indicates the imaging device is flying over a bright scene, and wherein the one or more processors are configured to determine the imaging device is being aimed at the bright scenery content when the imaging device has the angle being greater than the fourth threshold and the map data indicates the imaging device is over the bright scene.

In another exemplary embodiment of the disclosed systems, the one or more processors are configured to determine local seasonal data and weather data.

In another exemplary embodiment of the disclosed systems, the one or more processors are configured to choose a High Dynamic Range ("HDR") mode when the imaging device is being aimed at a horizontal direction and being aimed directly at the sun.

In another exemplary embodiment of the disclosed systems, the one or more processors are configured to choose a dark mode of the imaging device when the imaging device is being aimed at a green mountain.

In another exemplary embodiment of the disclosed systems, the one or more processors are configured to choose a bright mode of the imaging device when the imaging device is being aimed at bright scenery content.

In another exemplary embodiment of the disclosed systems, the one or more processors are configured to choose a default daytime mode when the imaging device is operating during a day and the scenery content cannot be determined, wherein, the day is determined via the local seasonal data and a clock time.

In another exemplary embodiment of the disclosed systems, the one or more processors are configured to choose a default nighttime mode when the imaging device is operating during a night and the scenery content cannot be determined, wherein, the day is determined via the local seasonal data and a clock time.

In another exemplary embodiment of the disclosed systems, the mobile platform is an Unmanned Mobile platform ("UAV").

Figure 1:
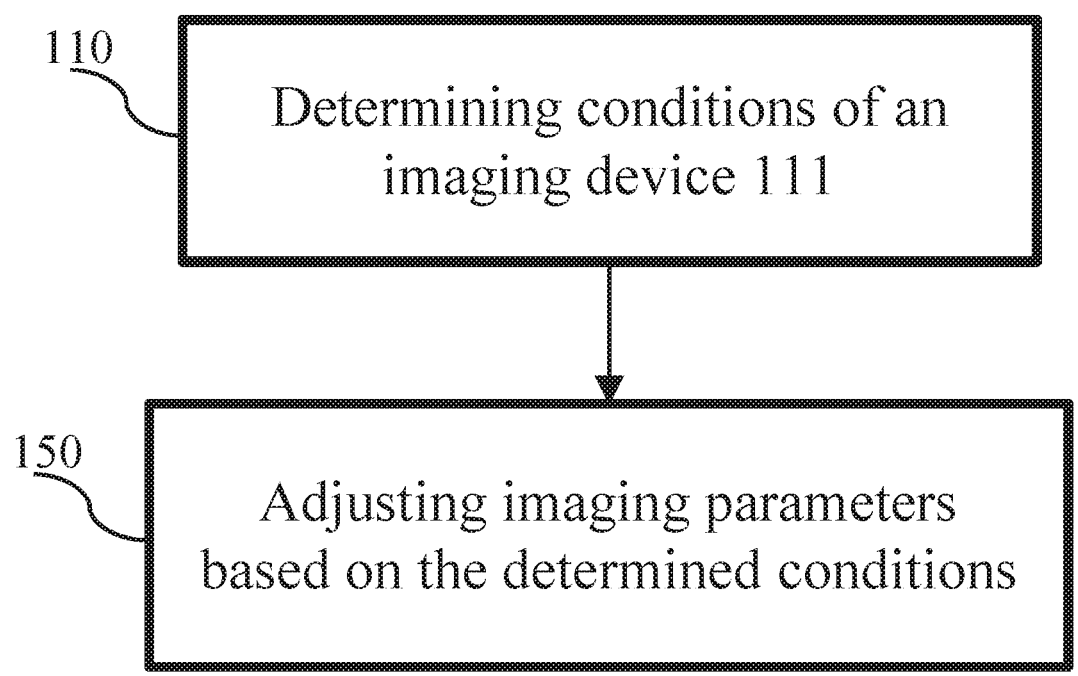
FIG. 1 is an exemplary top level flowchart diagram illustrating an embodiment of a method for performing image processing.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

Since currently-available imaging devices have limited ability to use operating condition data for adjusting imaging parameters, a system of using condition data already available on the mobile platform can prove desirable and provide a basis for imaging systems operating on the mobile platform. This result can be achieved, according to one embodiment disclosed in FIG. 1.

If the imaging devices installed aboard a mobile platform, for example, the mobile platform can include certain sensors. As an exemplary example, when the mobile platform is an aerial vehicle, sensors for detecting location, height and other ambient conditions are available for obtaining condition parameters. In addition, there are also certain available information that can be preloaded and used to decide scenery content, including the object of interest, a surrounding of the imaging device and the like. Such information can provide bases for adjusting the imaging parameters.

FIG. 1 illustrates an exemplary embodiment of a method 100 for performing image processing. When operating in a working environment, an imaging device 111 can be exposed to various operating conditions (or imaging conditions) that can affect the imaging device 111. Such operating conditions can include an ambient condition and/or a scenery content of a frame captured by the imaging device 111. In FIG. 1, one or more of the operating conditions of the imaging device 111 can be determined, at 110, via sensing devices 251-254 (shown in FIG. 2) associated with the mobile platform 200 or the imaging device 111. Detailed examples regarding the conditions and the acquisition of the conditions of the imaging device 111 are discussed below with reference to FIGS. 3 and 4.

At 150, one or more parameters of the imaging device 111 can be adjusted based on the determined conditions, which can include the ambient condition and/or the scenery content. Exemplary parameters can include, for example, white balance and/or color compensation. In an exemplary embodiment, the white balance can be adjusted by using the parameters decided by the ambient condition and/or the scenery content, for example, whether the imaging device 111 is operating in an indoor setting or an outdoor setting, respectively. Similarly, the color compensation can also be adjusted by using the parameters decided by the ambient condition and/or the scenery content, for example, whether the imaging device 111 is directed toward a white snow scene or a green mountain scene.

Figure 2:
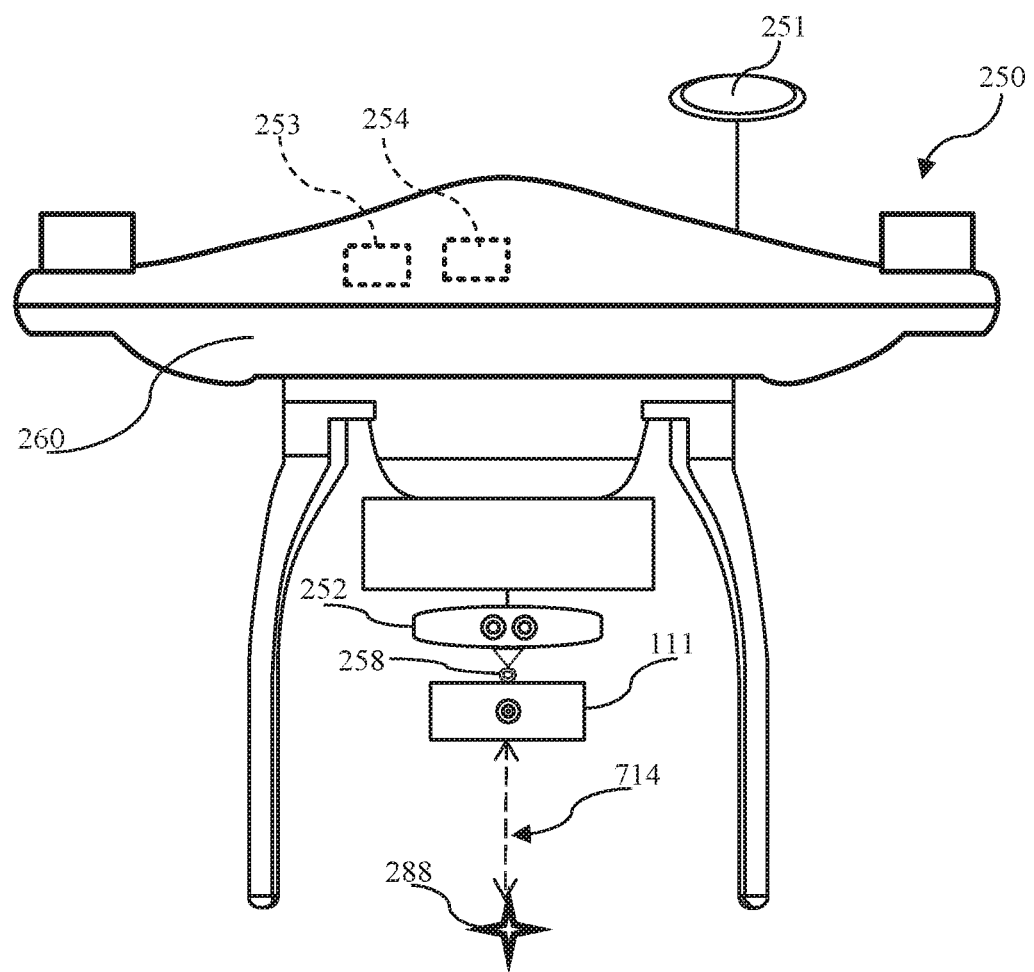
FIG. 2 is an exemplary schematic diagram, illustrating an embodiment of a mobile platform with an imaging device having imaging parameters that can be adjusted in accordance with the method of FIG. 1.

In one embodiment, the imaging device 111 can be a camera, or a video camera, with at least one lens, which camera optionally can be installed on a mobile platform 200 (shown in FIG. 2). Each parameter can be adjusted by selecting a specifically designed operation mode of the imaging device 111. A selected parameter can be adjusted independently from other parameters and/or in conjunction with at least one other parameter. Adjustment and selection of the imaging mode and/or parameters will be described below with reference to FIGS. 3-7.

Although shown and described as using the ambient condition and the scenery content for bases of adjusting imaging parameters for illustration purposes only, the system can use other suitable conditions as bases for adjusting the imaging parameters.

The method 100 can advantageously make use of sensing devices 251-254 (shown in FIG. 2) associated with the mobile platform 200 and/or certain data preloaded onto (or otherwise stored aboard) the mobile platform 200 for determining the operating conditions of the imaging device 111 attached to the mobile platform 200. The operating conditions can be bases to adjust at least one imaging parameter of the imaging device 111 to optimize imaging quality of the imaging device 111. In addition, the adjustment can be performed automatically by the imaging device 111 while performing an imaging task to ensure the quality through a course of the imaging task.

The data preloaded onto the mobile platform 200 can include, but is not limited to, data acquired via an internet connection during operations of the mobile platform 200. In some embodiments, such data can be acquired via certain application programs in a real-time manner whenever the data is needed. Such data can include, but is not limited to, real-time weather forecast and local map etc.

FIG. 2 shows a mobile platform 200 with devices 251-254 for implementing the method 100 (shown in FIG. 1). The devices 251-254 can detect conditions, or condition parameters, for adjusting imaging parameters of the imaging device 111. For example, the devices 251-254 can include at least a GPS 251, one or more ultrasonic devices (or ultrasonic detectors) 252, barometer 253 and an Inertial Measurement Unit ("IMU") 254. Among the devices 251-254, the GPS 251, the ultrasonic devices 252 and/or the barometer 253 can be used to detect the height (or altitude or elevation) 714 of the mobile platform 200, and the GPS 251 can be used to detect a position of the mobile platform 200. In addition, the IMU 254 can be used to detect an orientation 712 of the mobile platform 200, and the ultrasonic devices 252 can be used to detect a distance to an object 288 such as the ground. Therefore, the distance between the ultrasonic devices 252 and the object 288 can represent a vertical height 714 of the mobile platform 200 relative to ground level.

In FIG. 2, an optional gimbal 258 can be provided for installing the imaging device 111. The gimbal 258 can be controlled to provide an orientation 722 and a tilt angle 726 (collectively shown in FIG. 9) of the imaging device 111 relative to the mobile platform 200. The orientation 722 and the tilt angle 716 of the imaging device 111 can be detected and used to calculate an orientation 732, a height 734 and a tilt angle 736 of the imaging device 111 relative to the ground level.

In FIG. 2, the GPS 251 can be installed at a suitable location, such as an upper region, of a body (or fuselage) 260 of the mobile platform 200. The ultrasonic devices 252 can be arranged around a lower region of the body 260. The barometer 253 can be installed in the body 260 of the mobile platform 200. The imaging device 111 can be arranged under the body 260. However, under this disclosure, the GPS 251 and the barometer 253 can be disposed on any part of the mobile platform 200, such as inside the body 260, under the body 260 or any side of the body 260 etc. The ultrasonic devices 252 can be disposed anywhere around the body 260. The imaging device 111 can be disposed at any suitable position of the lower part of the body 260.

Although shown and described as using the devices 251-254 for purposes of illustrations only, any other suitable devices can also be used for detecting the conditions for adjusting the imaging parameters. The mobile platform 200 can comprise any conventional type of mobile platform that can have an elevation and is illustrated in FIG. 2 as comprising an unmanned mobile platform (UAV) 250 for purposes of illustration only and not for purposes of limitation.

Figure 3:
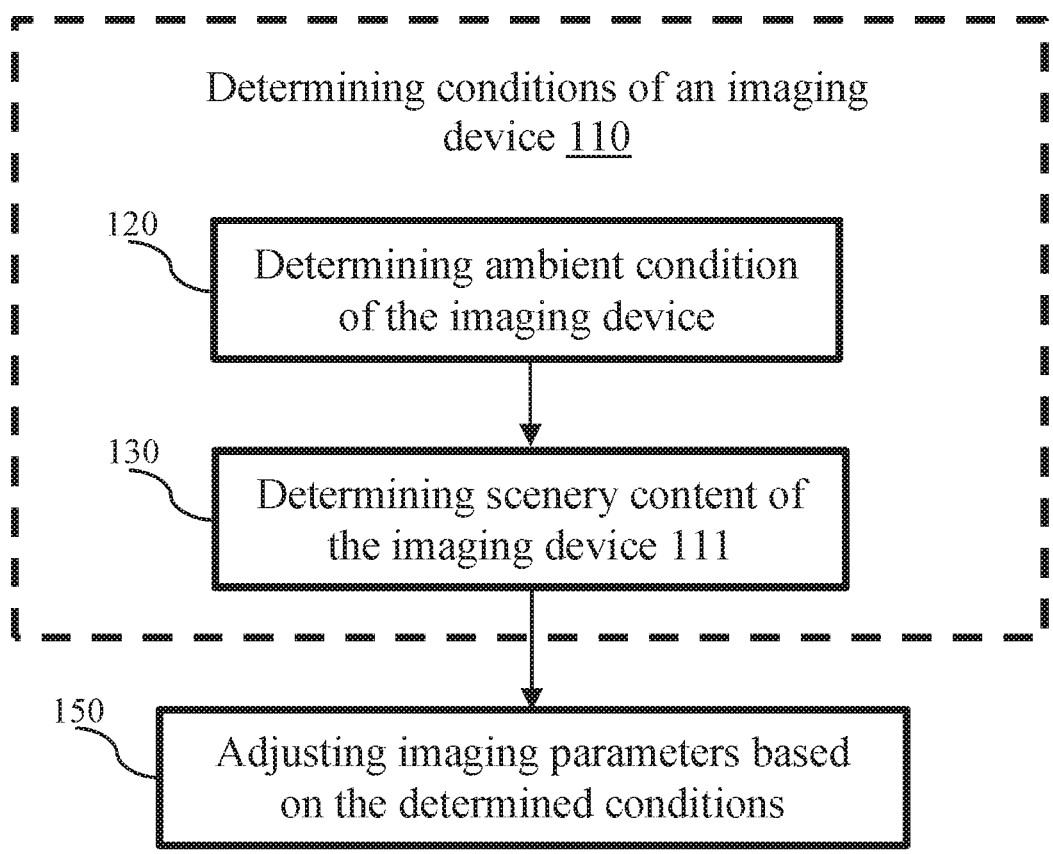
FIG. 3 is an exemplary flowchart of an alternative embodiment of the method of FIG. 1, wherein imaging parameters are selected based upon two types of conditions.

FIG. 3 shows an alternative embodiment of the method 100, wherein the operating conditions of the imaging device 111 can be determined for adjusting the imaging parameters of the imaging device 111 (shown in FIG. 2). In FIG. 3, the conditions of the imaging device 111 can be determined, at 120, 130. At 120, an ambient condition of the imaging device 111 can be determined. The ambient condition can include, for example, whether the imaging device 111 is working in an indoor setting or an outdoor setting. Detail regarding detecting whether the imaging device 111 is operating in which setting will be provided below with reference to FIGS. 4-5.

Although shown and described as including indoor setting and outdoor setting for purposes of illustration only, the ambient condition can include other settings, for example, a daylight setting, a nightlight setting, a shady setting, a cold setting or warm setting. The settings can be provided individually or in groups, such as the indoor setting and outdoor setting.

At 130, a second aspect of the operating conditions of the imaging device 111, a scenery content of the image, can be determined. The scenery content can reflect an object that the imaging device 111 is directed toward (or being aimed at), including, but not limited to, a green mountain scene, a white snow scene, a water body scene and a horizon scene etc. Detail of detecting the scenery content will be shown and described below with reference to FIG. 8.

Although shown and described as being ambient condition and scenery content for illustration purpose only, other suitable conditions can be used for selecting operation modes and/or adjusting imaging parameters of the imaging device 111.

As shown and described with reference to FIG. 1, at least one imaging parameter can be adjusted, at 150, based on the determined ambient condition and/or the determined scenery content. The at least one imaging parameter alternatively and/or additionally can be adjusted via selecting an imaging mode based on the determined ambient condition and/or the determined scenery content, at 150. The at least one imaging parameter can also be adjusted by simply changing a value of the imaging parameter based on the determined conditions.

Figure 4:
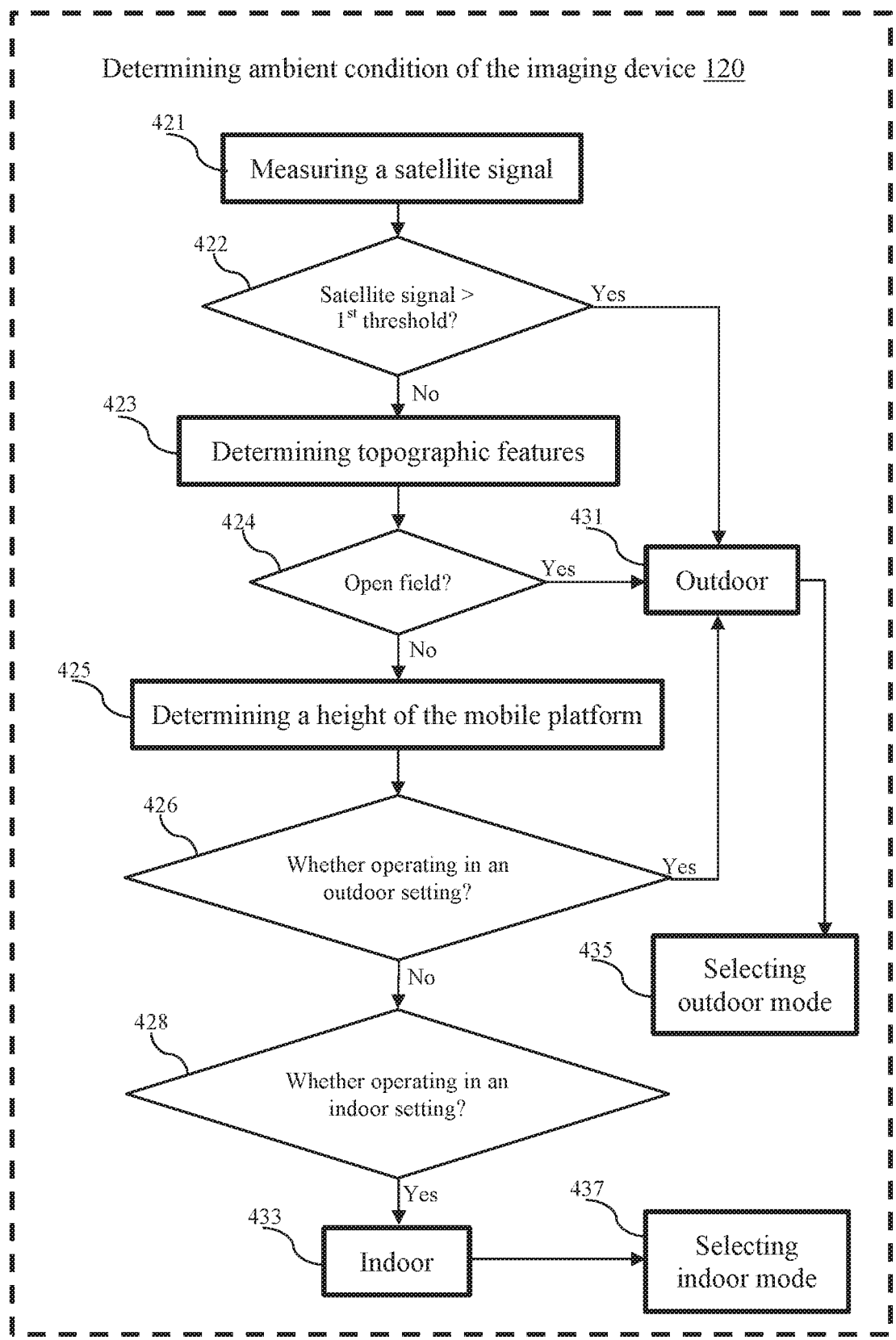
FIG. 4 is an exemplary flowchart of another alternative embodiment of the method of FIG. 1, wherein an imaging mode of the imaging device is selected based upon an ambient condition of the imaging device.

FIG. 4 shows another alternative embodiment of the method 100, wherein the ambient condition is used for adjusting an imaging mode. In FIG. 4, the ambient condition can be determined, at 120. As described with reference to FIG. 3, the ambient condition can include, but not limited to, whether the imaging device 111 is operating in an outdoor setting or an indoor setting. The outdoor and/or indoor settings can be decided, for illustrative purposes, with measuring a level of a satellite signal, at 421, via a satellite signal receiving device, for example a Global Positioning Device (GPS) 251 (shown in FIG. 2). The level of the satellite signal can be measured by a number of satellites that the GPS 251 can receive. When signals from more satellites are received, the imaging device 111 can be more likely operating in an outdoor setting. On another hand, when signals from fewer satellites are received, the imaging device 111 can be more likely operating in an indoor setting. However, in case few satellite signals are received, the situation can also be that the GPS 251 is hindered by cloud or certain structure between the GPS 251 and the satellites, including but not limited to, buildings, trees and/or mountains etc. Therefore, additional considerations can be involved for further determinations in case few satellite signals are received.

At 421, the number of the received satellites can be measured to determine a first condition for deciding the imaging device 111 being operating in an outdoor setting. When the number of the received satellites is greater than or equal to a first satellite threshold ST1, at 422, the imaging device 111 can be determined as operating in an outdoor setting, at 431. The first satellite threshold ST1 can be, as an exemplary example, five satellites. When the number of satellite received by the GPS 251 is less than the first threshold TH1, one or more further determinations can be employed.

At 423, first topographic features of the ambient setting, wherein the mobile platform is operating, can be considered for deciding the operating condition of the imaging device 111 or the mobile platform 200. Typical exemplary first topographic features can include existing structures on the ground level, include but are not limited to mountains, trees, buildings, stadiums and the like. Without any structure, the ground is defined as an open field. When the mobile platform 200 is determined to be flying in an open field, at 424, the mobile platform 200 can be determined to be operating in an outdoor setting because there is no structure on the ground that can shade the mobile platform 200. When the imaging device 111 is determined as operating in an outdoor setting, at 431, an outdoor mode can be selected, at 435.

When the mobile platform 200 is determined to be flying in an area with structures, further considerations can be needed to determine the ambient condition of the mobile platform 200. At 425, a flying height 714 (or altitude) of the mobile platform 200 can be decided as an additional factor for determining the operating condition of the mobile platform 200. The height 714 value can be combined with the first topographic features to decide which setting the mobile platform 200 is operating in.

At 426, the mobile platform 200 is determined whether operating in an outdoor setting. When the mobile platform 200 is determined to be flying in an area lack of special types of buildings, such as a dome or an enclosed stadium, the mobile platform 200 can be determined to be operating in an outdoor setting. In some embodiments, when the mobile platform 200 is flying in an area with the special types of buildings, such as a dome or an enclosed stadium, but the mobile platform 200 is determined to be flying at a height 714 (or altitude) greater than or equal to a height of a building under the mobile platform 200, the mobile platform 200 can be determined to be operating in an outdoor setting. In another alternative embodiment, when the height of the building is unknown, the mobile platform 200 can be decided as operating in an outdoor setting when the flying height 714 of the mobile platform 200 is greater than a second height threshold HT2. In an exemplary embodiment, the second height threshold HT2 can be selected from a range of twenty meters to fifty meters, such as thirty meters.

At 428, the mobile platform 200 is determined whether operating in an indoor setting. When the mobile platform is flying directly over a certain structure, including but not limited to a dome and an enclosed stadium, and the flying height 714 of the mobile platform 200 is determined to be less than the height of the structure, the mobile platform 200 can be determined as operating in an indoor setting, at 433. The imaging device 111 can select an indoor operation mode, at 437.

In some embodiments, for purposes of determining whether the mobile platform 200 is operating in the indoor setting, at 428, certain open buildings can be considered as open areas (or open fields), including, but not limited to, an open stadium or any other structures without a cover. In other embodiments, the open buildings can be pre-marked via, for example, a configuration process, for performing the determination at 428. When determined to be flying over any of the pre-marked open buildings, the mobile platform 200 can be determined to be operating in the outdoor setting regardless of the flying height 714 of the mobile platform 200.

In an alternative embodiment, the indoor mode, the outdoor mode or an imaging device default mode can be a default operation mode of the imaging device 111, which mode can be a selected when an ambient condition cannot be determined via the procedures described herein.

Additionally, the order of 422, 424, 426 and 428 may be determined based on how easy the ambient condition can be determined. For example, the step 426 may be performed before the step 428, since it is easier to determine that the mobile platform 200 is operating in an outdoor setting than in an indoor setting. Alternatively, the order of 422, 424, 426 and 428 can be adjusted as necessary in determining the ambient condition of the imaging device 111. In addition, each or both of the procedures 426, 428 can be repeated for determining the ambient condition.

Although shown and described as using a satellite signal and/or a height 714 for determining an outdoor setting for illustrative purposes only, any other suitable information can be used or otherwise considered in the determination. Although shown and described as a determination order from 421 to 428 for purposes of illustration only, any other suitable orders can also be employed for determining the ambient condition of the imaging device 111.

Figure 5:
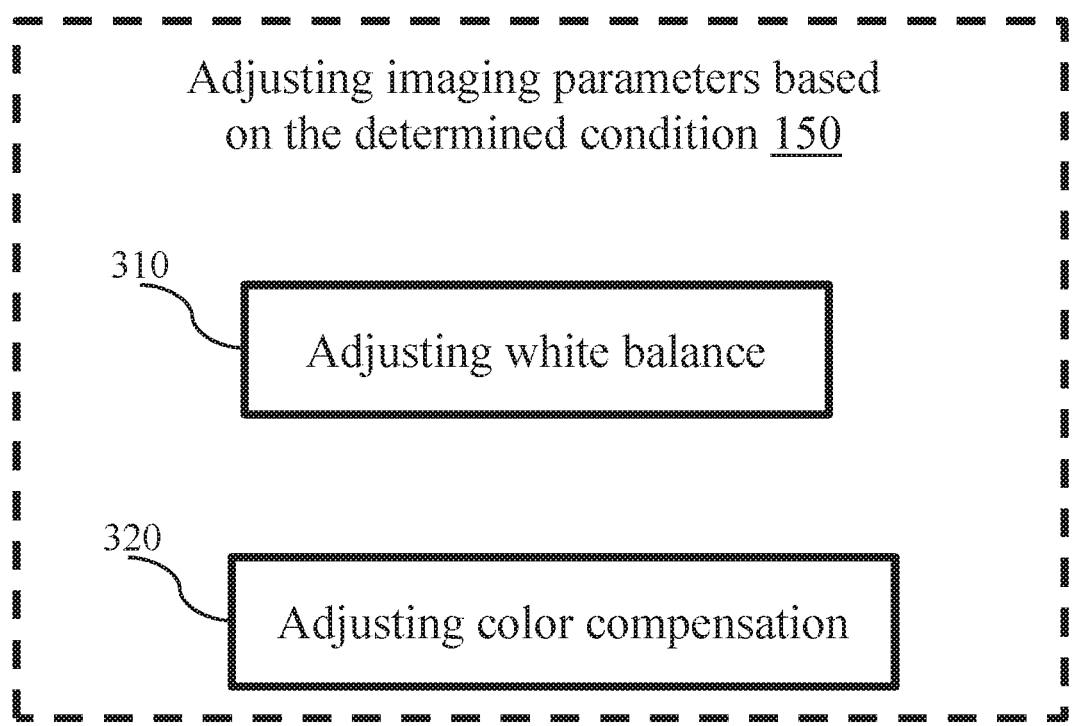
FIG. 5 is an exemplary flowchart of another alternative embodiment of the method of FIG. 3, wherein the imaging parameters are selected based on the ambient condition.
Figure 6:
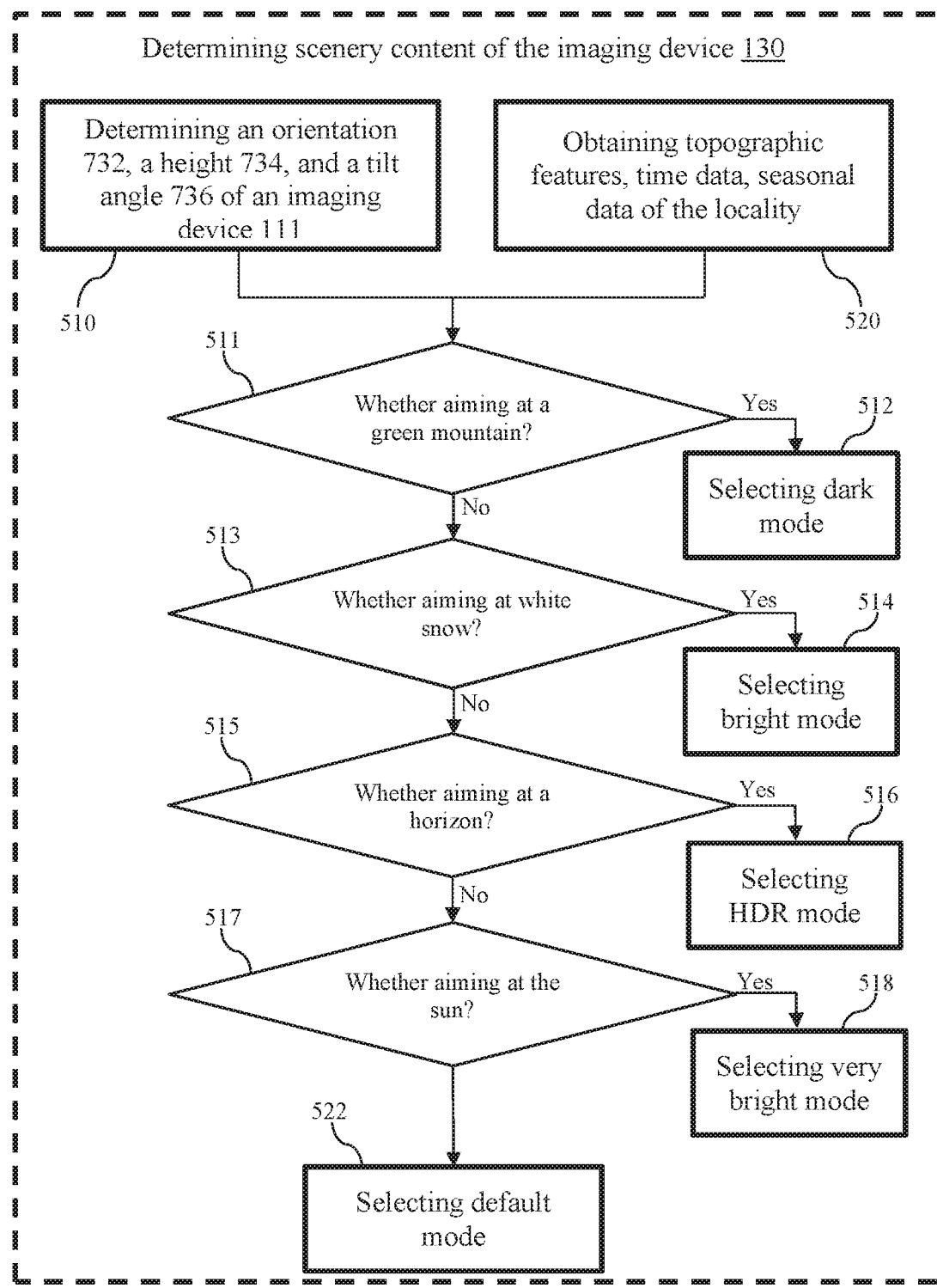
FIG. 6 is an exemplary flowchart of another alternative embodiment of the method of FIG. 3, wherein the second type of condition is used to select the operation mode and/or imaging parameters of the imaging device.

FIG. 5 shows another exemplary embodiment of the method 100, wherein certain imaging parameters are selected based on the determined ambient condition. In FIG. 6, at 310, a while balance, for example, can be adjusted based on the determined ambient condition. The white balance is a process for removing unrealistic color casts, so that an object that appears white in reality is rendered white in an image. In an exemplary embodiment, the white balance can be adjusted to different values based on, for example, whether the imaging device 111 is in an outdoor setting or an indoor setting, at 310.

At 320, color compensation can be adjusted based on the determined ambient condition. The color compensation (or color correction) is a process, by using color gels or filters, of altering an overall color of light in a particular image. Typically the light color is measured on a scale known as color temperature. Without the color gels, a scene can have a mix of various colors. With the color gels correctly, colors from various light sources can be altered to match each other. In an exemplary embodiment, the color compensation can be adjusted to different values based on whether the imaging device 111 is operating in an outdoor setting or an indoor setting, at 320.

Although shown and described as using white balance and color adjustment for purposes of illustration only, other parameters can be used to adjust an imaging effect, or imaging quality, based on the determined conditions.

FIG. 6 shows another exemplary embodiment of the method 100, wherein a scenery content of an imaging device 111 is used to adjust imaging parameters of the imaging device 111. In FIG. 6, at 510, an orientation 732, a flying height 734 and a tilt angle 736 (collectively shown in FIG. 9) of the imaging device 111 can be determined. In this disclosure, the flying height (or height) 734 means an altitude, or an elevation, of the mobile platform is flying at.

At 520, certain preloaded second topographic features, time data and seasonal data can be combined with the second condition data to determine scenery content. The second topographic features herein can include, but are not limited to, a mountain, a white snow area, plants, bare ground and/or any other structure. One difference between the first topographic features and the second topographic features can be that the first topographic features define ambient condition and the second topographic features define scenery content of an image.

The preloaded second topographic features can include, but is not limited to, data acquired via an internet connection during operations of the mobile platform 200. In some embodiments, such data can be acquired via certain application programs in a real-time manner whenever the data is needed.

In FIG. 6, four exemplary conditions 511, 513, 515, 517 are listed for purposes of illustration. At 511, the topographic features can be considered to determine whether the mobile platform is flying over certain area that can be covered with trees or any other structure with dark color. Local season data can also be considered to determine whether the area is covered with dark color in the season. When the imaging device 111 is determined being aimed at a scene with the dark color, at 511, the imaging device 111 can select a dark mode, at 512.

At 513, the topographic features can also be considered to determine whether the mobile platform 200 is flying over certain area that can be covered with white snow or bright color. The local season data can be considered to determine whether the area is covered with white snow at a time when the imaging device 111 is operating. When the imaging device 111 is determined being aimed at a scene with the bright color, at 513, the imaging device 111 can select a bright mode, at 514.

At 515, the orientation 712 and tilt angle 716 data can be used to determine whether the imaging device 111 is being aimed at the horizontal direction. The local season data can also be considered to determine whether the horizon has a great contrast. When the imaging device 111 is determined being aimed at the horizontal direction, at 515, especially when the sun is right below the horizon, the imaging device 111 can select a High Dynamic Range ("HDR") mode, at 516.

At 517, the orientation 712 and tilt angle 716 data can also be used to determine whether the imaging device 111 is being aimed at a very bright object, such as the sun or a fire (a volcano). The local season data can also be considered to determine whether the imaging device 111 can be aimed at the very bright object. When the imaging device 111 is determined being aimed at the very bright object, at 517, the imaging device 111 can select a very bright mode, at 518.

The modes 512, 514, 516, 518 are shown for describing the conditions for purposes of illustration only. Other suitable operation modes can be applied for other operating conditions. Also, different sequences for applying the different operating conditions can be employed by the different operation modes without limitation.

When no listed condition is determined, a default mode can be selected and at least one imaging parameter can be adjusted to a value associated with the default mode.

Figure 7:
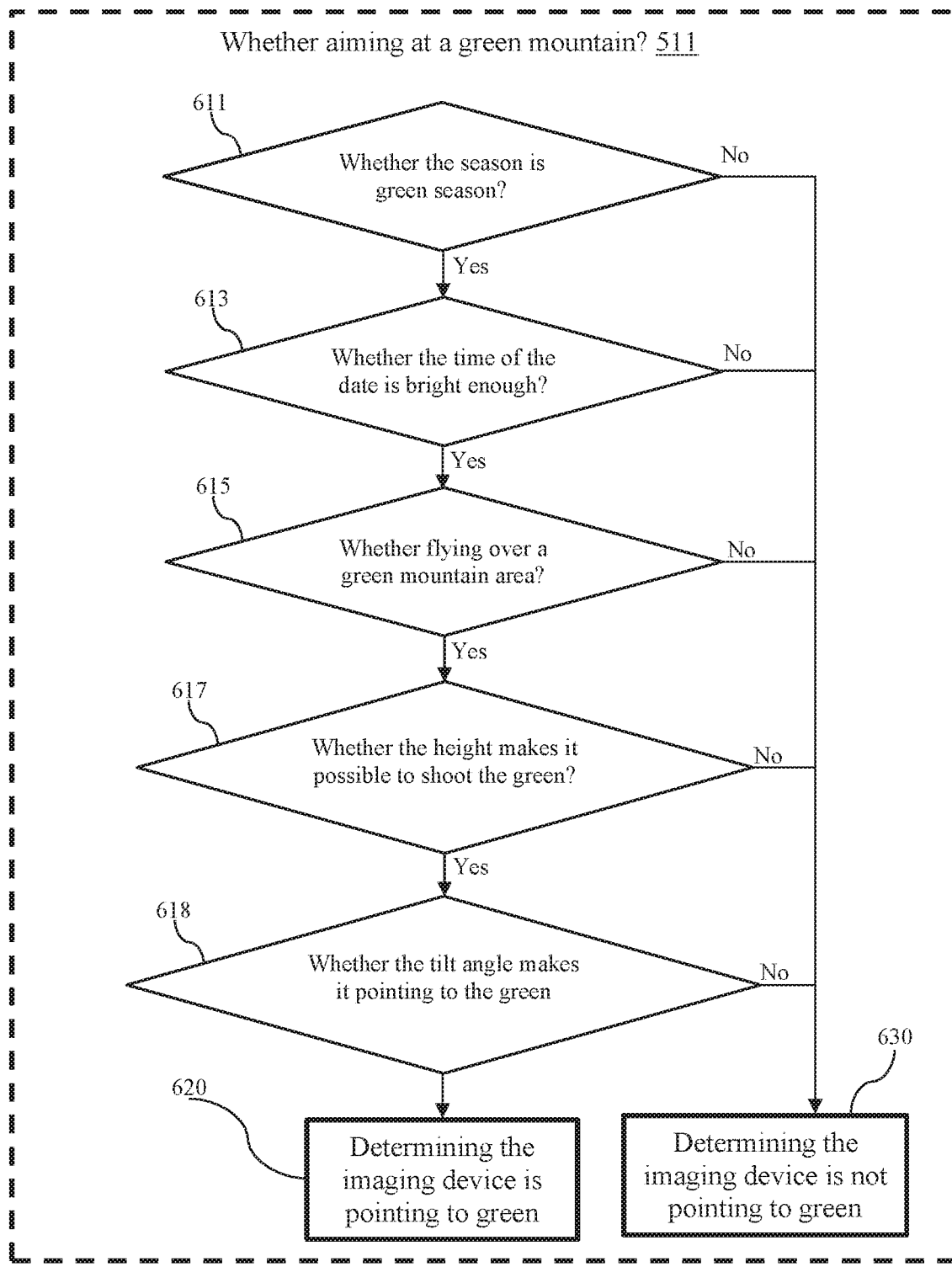
FIG. 7 is an exemplary flowchart of another alternative embodiment of the method of FIG. 1, wherein the method includes determining whether the imaging device is being aimed at a green mountain.

FIG. 7 shows an exemplary embodiment of the system 100, wherein a determination of the imaging device 111 (shown in FIG. 2) being aimed at a green mountain, an example of dark color object, is illustrated as an example for determining the scenery content, at 511. In FIG. 7, at 611, local seasonal data can be considered to decide whether a date is within a green season in a local area. In an exemplary embodiment, the green season can be determined with statistical data of the local area. As an exemplary example, a start threshold and an end threshold of a green season can be determined based on the statistical data. If the date falls within a period not earlier than the green season start threshold and not later than the green season end threshold, the imaging device 111 can be determined as flying over a green mountain area, or a dark color area, at 611.

At 613, local time can be considered to decide whether there can be enough daylight to reflect the dark color onto an image. If there is not enough daylight, there is no need to determine whether the imaging device 111 is being aimed at the green mountain, or the dark color object. If there is enough daylight, a position of the mobile platform 200 can be considered with the topographic features to determine whether the imaging device 111 is flying over the green mountain area, at 615. The position of the mobile platform 200, for example, can be represented by a longitude coordinate and latitude coordinate. When the position is determined to be within an area defined by a green mountain area, the mobile platform 200 can be determined as being flying over the green mountain area.

Even when the mobile platform 200 is flying over the green mountain area and the green mountain is covered with green color, a physical position of the mobile platform 200 can be determined whether the imaging device 111 is literally being aimed at the green mountain area. At 617, the height 734 of the mobile platform 200 can be higher than a third height threshold HT3 and lower than a fourth threshold HT4.

The height 734 of the imaging device 111 can combine with a tilt angle 736 of the imaging device 111 to determine whether the imaging device 111 is being aimed at the green mountain, at 618. In some embodiments, the less the tilt angle 716 is, the greater the height 714 can be allowed for the imaging device 111 to be aimed at the green mountain area, and vice versa.

Although show and described as determining being aimed at the green mountain for purposes of illustration only, similar method can be applied for determining whether the imaging device 111 is being aimed at a bright area, a horizon and/or a sun etc.

Figure 8:
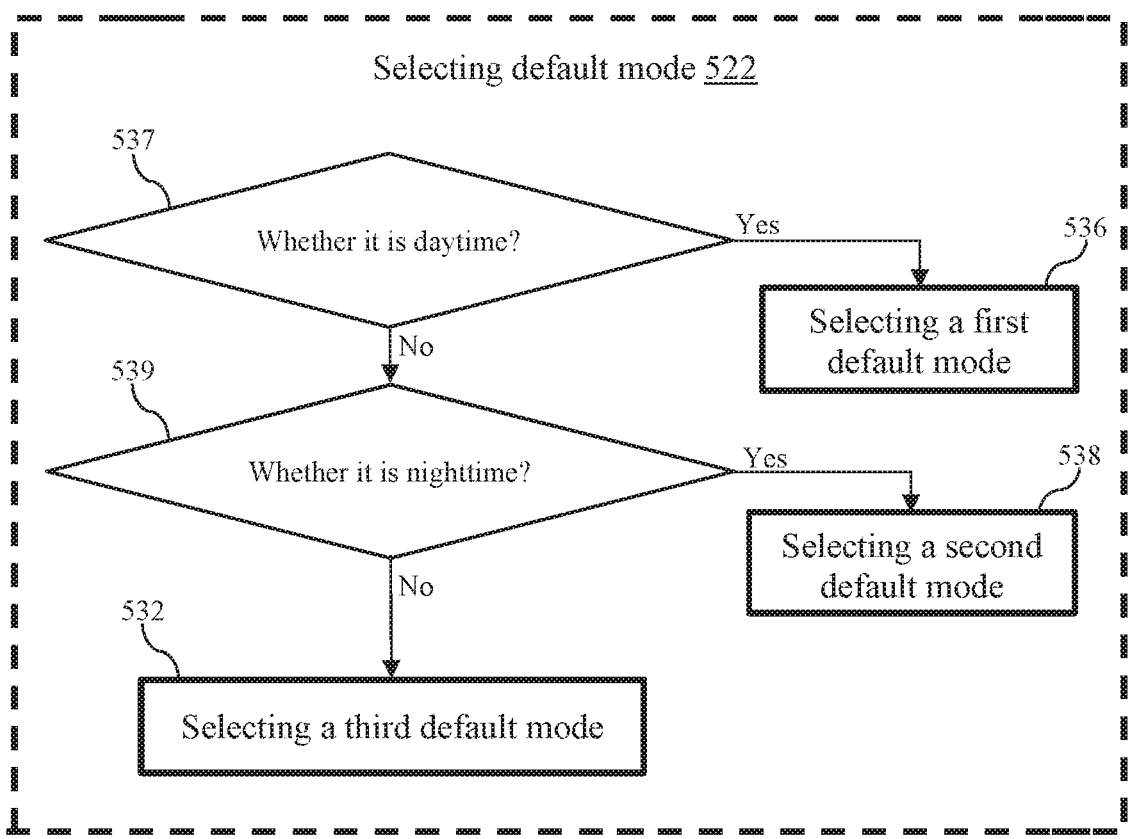
FIG. 8 is an exemplary flowchart of an alternative embodiment of the method of FIG. 3, wherein a default mode is selectable.

FIG. 8 illustrates another exemplary embodiment of the method 100, wherein the default mode can be separated into various default modes. The default mode, at 522, can be categorized into different default modes for different default conditions. In an exemplary embodiment, the default mode can be categorized based on an availability of light. At 537, when the imaging device 111 is operating under daylight, a first default mode can be selected, at 536. The first default mode can be a mode that is specially designed to operate under daylight and regardless of any other conditions. At 539, when the imaging device 111 is operating under nightlight, a second default mode can be selected, at 538. The second default mode can be a mode that is specially designed to operate under nightlight and regardless of any other conditions.

Although shown and described as using the first default mode under daytime and the second default mode under nighttime, other default modes can also be applied under different conditions. In addition, when neither the daytime nor the nighttime can be determined, a third default mode can be selected, at 532. The third default mode can be a general default mode, designed to operate under any condition.

Figure 9:
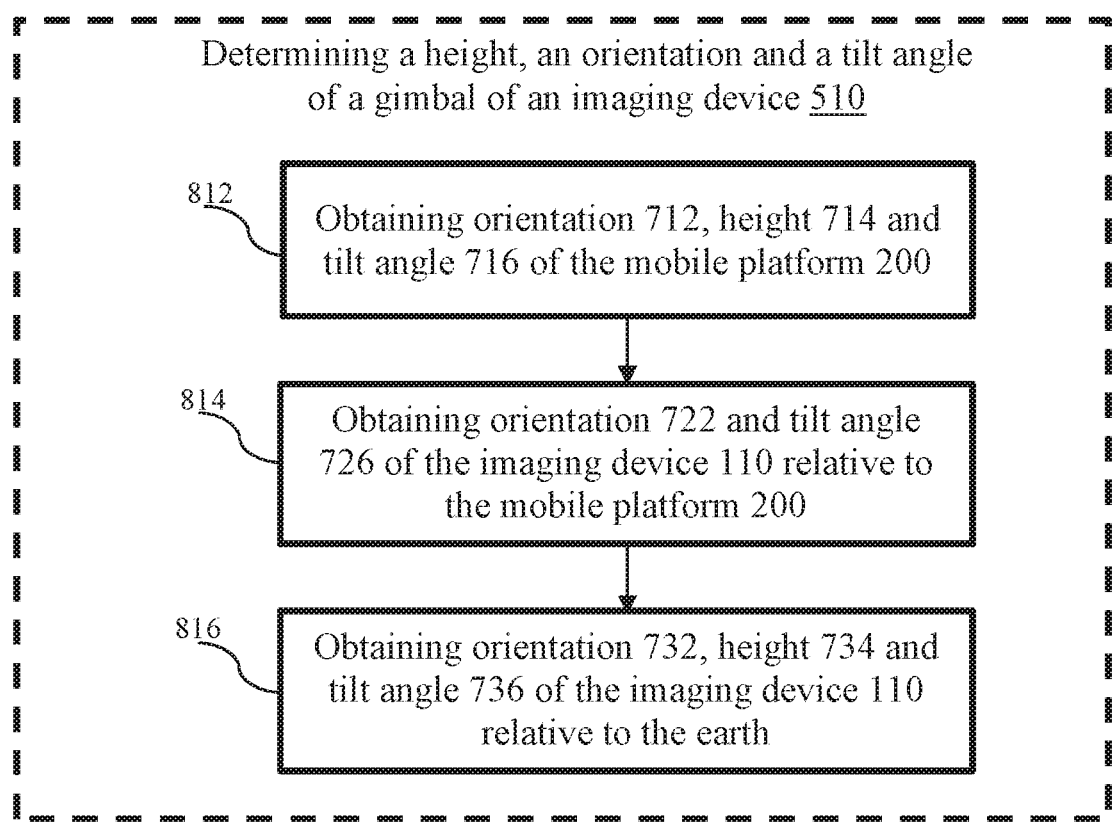
FIG. 9 is an exemplary flowchart of another alternative embodiment of the method of FIG. 5, wherein an orientation, a height, and a tilt angle of the imaging device are obtained.

FIG. 9 shows yet another exemplary embodiment of the method 100, wherein an orientation 732, a height 734, and a tilt angle 736 of the imaging device 111 are obtained. In FIG. 9, the orientation 712, the height 714, and the tilt angle 716 of the mobile platform 200 can be obtained, at 812. As shown and described with reference to FIG. 2, the orientation 712 of the mobile platform 200 can be obtained via the IMU 254; the height 714 of the mobile platform 200 can be obtained via the barometer 253, the ultrasonic devices 252 and/or the GPS 251; the tilt angle 716 of the mobile platform 200 can also be obtained via the IMU 254.

The imaging device 111, which is installed on the mobile platform 200 via an optional gimbal 258 (shown in FIG. 2), can also have an orientation 722 and/or a tilt angle 726, both relative to the mobile platform 200. At 814, the orientation 722 and the tilt angle 726 of the imaging device 111 relative to the mobile platform 200 can be obtained. In an exemplary embodiment, the orientation 722 and the tilt angle 726 can be obtained with one or more position sensors of the gimbal 258.

At 816, the orientation 732, the height 734 and the tilt angle 736 of the imaging device 111, relative to the ground level, can be obtained. The orientation 732 of the imaging device 111 relative to the ground can be obtained by combining the orientation 712 of the mobile platform 200 and the orientation 722 of the imaging device 111 relative to the mobile platform 200. The height 734 of the imaging device 111 can be obtained via the height 714 of the mobile platform 200. The tilt angle 736 of the imaging device 111 can be obtained via the tilt angle 716 of the mobile platform 200 and the tilt angle 726 of the imaging device 111 relative to the mobile platform 200.

Figure 10:
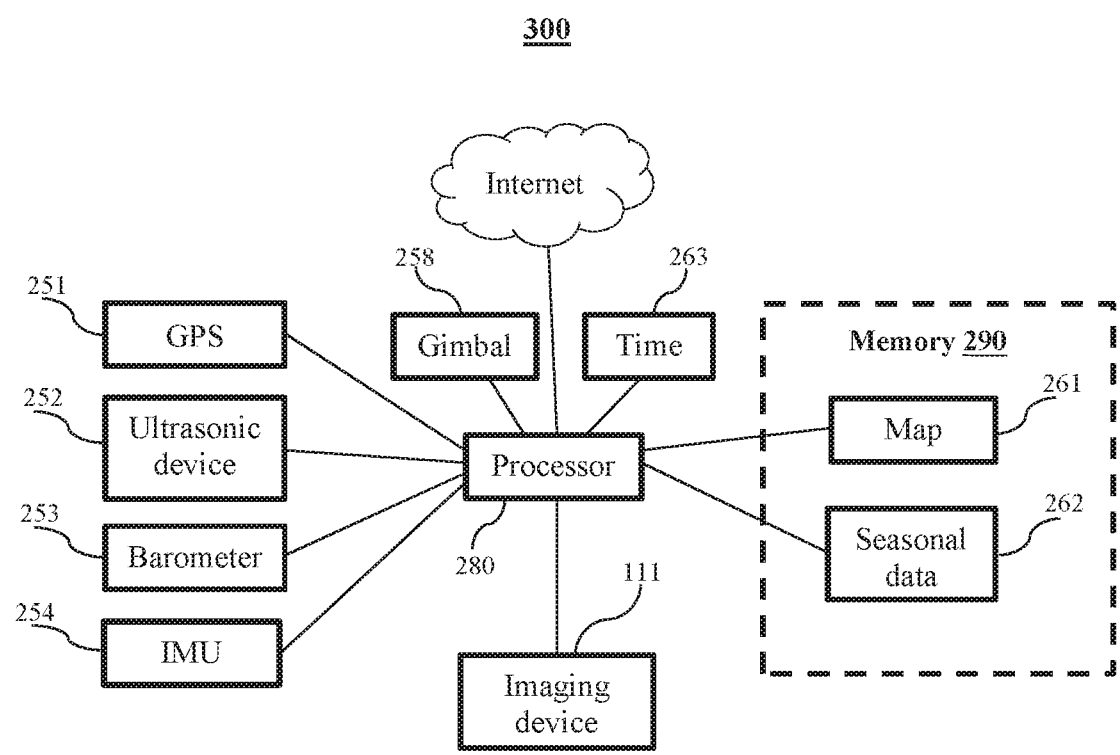
FIG. 10 is an exemplary block diagram of an imaging system, wherein the ambient condition and the scenery content of the imaging device 111 can be utilized to adjust at least an imaging parameter of the imaging device.

FIG. 10 illustrates an exemplary embodiment of an imaging system 200, wherein the ambient condition and the scenery content of the imaging device 111 can be utilized to adjust at least one imaging parameter of the imaging device 111. The imaging system 300 can comprise a barometer 253, one or more ultrasonic devices 252, a Global Positioning System ("GPS") 251 and an Inertial Measurement Unit ("IMU") 254 in the manner discussed in more detail above with reference to FIG. 2. As depicted in FIG. 10, the barometer 253, ultrasonic devices 252, GPS 251 and IMU 254 are associated with a processor 280.

Each of the devices 251-254 can provide the processor 280 with selected information that can be used to determine the operating conditions. In exemplary embodiments, the barometer 253 can provide an atmosphere pressure to the processor 280, which atmospheric pressure can be used to calculate a height 714 (shown in FIG. 9) of the mobile platform 200. The ultrasonic devices 252 can provide an interval between an emitting time and a receiving time of an ultrasonic pulse, which interval can be used to calculate a distance between the mobile platform 200 and an object 288 (shown in FIG. 2), which distance can be the height 714 of the mobile platform 200. The GPS 251 can provide the processor 280 with location information, in addition to the height 714, of the mobile platform 200. The IMU 254 can provide the processor 280 with an orientation 712 and a tilt angle 716 of the mobile platform 200.

Although shown and described as associating the GPS 251, the ultrasonic devices 252, the barometer 253 and the IMU 254 with the processor 280 for purposes of illustration only, other suitable devices can be associated with the processor 280 for determining the operating conditions of the imaging device 111. Stated somewhat differently, the processor 280 can be associated with a plurality of suitable devices that can include at least one, or none, of the ultrasonic devices 252, the GPS 251 and the IMU 254.

In FIG. 10, a gimbal 258 can be associated with the processor 280 to provide the processor 280 with position data of the imaging device 111 relative to the mobile platform 200. The gimbal 258 is a platform for associating the imaging device 111 with the mobile platform 200, which platform can provide the imaging device 111 with the position data. The position data can include, for example, an orientation 722 and a tilt angle 726 of the imaging device 111 relative to the mobile platform 200. The processor 280 can calculate an orientation 732 and a tilt angle 736 of the imaging device 111 relative to the ground based on the orientation 712, the height 714 and the tilt angle 716 of the mobile platform 200, and the orientation 722 and the tilt angle 726 of the imaging device 111. The processor 280 can also calculate a height 734 of the imaging device 111 based on the height 714 of the mobile platform 200.

Although shown and described as using the gimbal 258 to acquire position data of the imaging device 111 for purposes of illustration only, other suitable devices associated with the imaging device 111 can be associated with the processor 280 for providing position data of the imaging device 111.

In FIG. 10, the processor 280 can also be associated with a memory 290. Exemplary examples of the memory 290 can be a random access memory ("RAM"), static RAM, dynamic RAM, read-only memory ("ROM"), programmable ROM, erasable programmable ROM, electrically erasable programmable ROM, flash memory, secure digital ("SD") card, and the like. The memory 290 can be used to store preloaded data, including, but not limited to, a map 261 and seasonal data 262. The processor 280 can combine the preloaded data with a time 263 and the orientation 732, the height 734 and the tilt angle 736 of the imaging device 111 to determine a scenery content of the imaging device 111.

In FIG. 10, the processor 280 can have an internet connection for acquiring various data available online. Such internet connection can be a wireless connection or a wired connection. The processor 280 can refresh, via the internet connection, the preloaded data with online data periodically or on a real-time base. In some embodiments, the preloaded data can be acquired through the internet as needed, e.g. a local map and/or local weather data can be acquired by the processor 280 when such data is needed for determining the scenery content.

The processor 280 can comprise any commercially available graphic chip that chips can be used in currently available video equipment. The processor 280 can also be a custom-designed graphic chips specially produced for the imaging device 111. The processor 280 can also comprise additional chips for accelerating rendering of 2D (or 3D) scenes or other graphics, MPEG-2/MPEG-4 decoding, TV output, or an ability to connect multiple displays. Additionally and/or alternatively, the processor 280 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

The processor 280 can usually be operably connected to the image device 111 for adjusting one or more of the imaging parameters of the imaging device 111. The connection can be via a wired and/or wireless link. The processor 280 can be configured to perform any of the methods 100 described herein, including but not limited to, a variety of operations relating to image processing. In some embodiments, the processor 280 can include specialized hardware for processing specific operations relating to the image processing.

In some other embodiments, the memory can be used to store a software product that is programmed to perform any of the methods described herein, including but not limited to, a variety of operations relating to image processing.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for image processing, comprising:
   receiving satellite measurement data by a satellite measurement device associated with an imaging device;
   acquiring a location of the imaging device by using the satellite measurement data and a map;
   acquiring a height of the imaging device;
   determining an ambient condition of the imaging device, including:
      in response to the location of the imaging device being at an open field, determining that the imaging device is operating in an outdoor setting; and
      in response to the location of the imaging device being at an enclosed building structure and the height of the imaging device being equal to or greater than a height threshold, determining that the imaging device is operating in the outdoor setting; and adjusting an imaging parameter based on the ambient condition.

2. The method of claim 1, further comprising:
   determining a number of satellites from which satellite signals are received according to the satellite measurement data;
   generating a comparison result by comparing the number of satellites from which the satellite signals are received to a threshold number; and
   in response to the number of satellites from which the satellite signals are received being equal or greater than the threshold number, determining that the imaging device is operating in the outdoor setting.

3. The method of claim 2, further comprising:
   in response to the number of satellites from which the satellite signals are received being fewer than the threshold number, the height of the imaging device being lower than the height threshold, and the location of the imaging device being in a building area, determining that the imaging device is operating in an indoor setting.

4. The method of claim 1, wherein adjusting the imaging parameter comprises:
   in response to determining that the imaging device is operating in the outdoor setting, adjusting the imaging parameter to a first parameter value associated with an outdoor mode; and
   in response to determining that the imaging device is operating in an indoor setting, adjusting the imaging parameter to a second parameter value associated with an indoor mode.

5. The method of claim 1, further comprising:
   determining a scenery content of an image to be captured by the imaging device; and
   adjusting the imaging parameter according to the scenery content.

6. The method of claim 5, wherein determining the scenery content comprises determining the scenery content using at least one of a height of the imaging device, an orientation of the imaging device, a tilt angle of a gimbal of the imaging device, geographic data, time data, local seasonal data, or weather data.

7. A system for image processing, comprising:
   an imaging device associated with a mobile platform and configured to capture an image; and
   one or more processors configured to:
      receive satellite measurement data by a satellite measurement device associated with the imaging device;
      acquire a location of the imaging device by using the satellite measurement data and a map;
      acquire a height of the imaging device;
      determine an ambient condition of the imaging device, including:
         in response to the location of the imaging device being at an open field, determining that the imaging device is operating in an outdoor setting; and
         in response to the location of the imaging device being at an enclosed building structure and the height of the imaging device being equal to or greater than a height threshold, determining that the imaging device is operating in the outdoor setting; and adjust an imaging parameter based on the ambient condition.

8. The system of claim 7, wherein the one or more processors are further configured to:
   determine a number of satellites from which satellite signals are received according to the satellite measurement data:
   generate a comparison result by comparing the number of satellites from which the satellite signals are received to a threshold number; and
   in response to the number of satellites from which the satellite signals are received being equal or greater than the threshold number, determine that the imaging device is operating in the outdoor setting.

9. The system of claim 8, wherein the one or more processors are further configured to:
   in response to the number of satellites from which the satellite signals are received being fewer than the threshold number, the height of the imaging device being lower than the height threshold, and the location of the imaging device being in a building area, determine that the imaging device is operating in an indoor setting.

10. The system of claim 7, wherein the one or more processors are further configured to:
    in response to determining that the imaging device is operating in the outdoor setting, adjust the imaging parameter to a first parameter value associated with an outdoor mode; and
    in response to determining that the imaging device is operating in an indoor setting, adjust the imaging parameter to a second parameter value associated with an indoor mode.

11. The system of claim 7, wherein the one or more processors are further configured to:
    determine a scenery content of an image to be captured by the imaging device; and
    adjust the imaging parameter according to the scenery content.

12. The system of claim 11, wherein the one or more processors are further configured to determine the scenery content using at least one of a height of the imaging device, an orientation of the imaging device, a tilt angle of a gimbal of the imaging device, geographic data, time data, local seasonal data, or weather data.

* * * * *